Dec. 8, 1959   J. F. NOTTELMANN ET AL   2,916,177
CONDUIT BOX ADAPTER
Filed Dec. 28, 1955
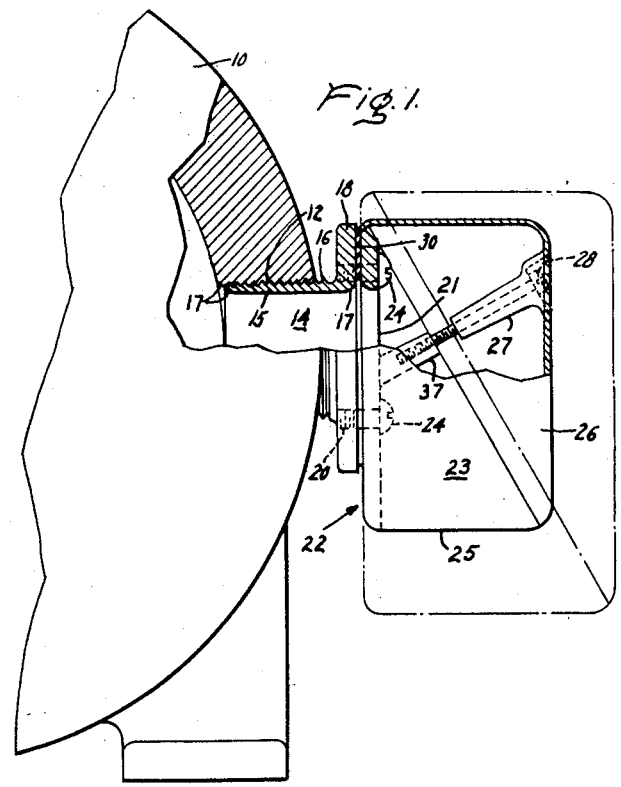
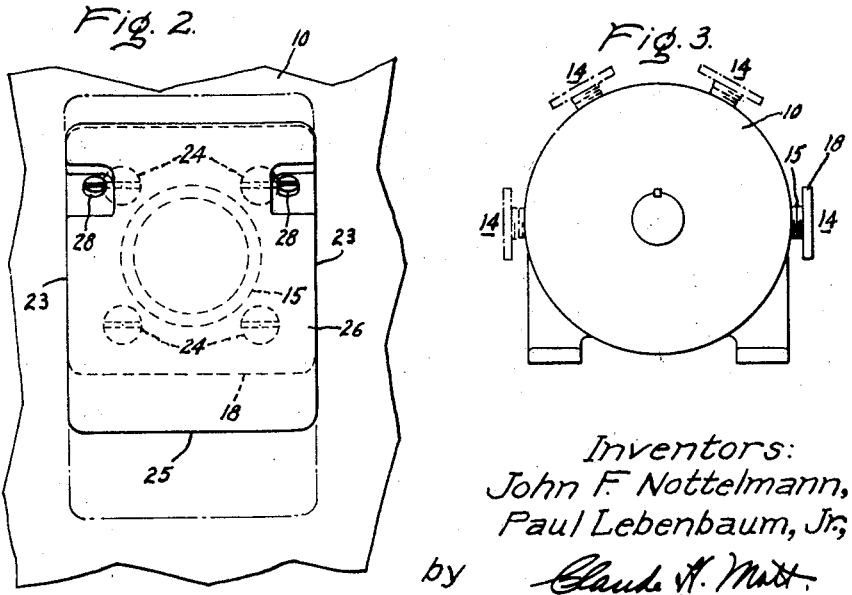
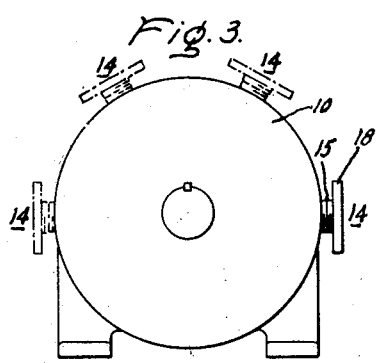
Inventors:
John F. Nottelmann,
Paul Lebenbaum, Jr.,
by Claude A. Matt
Their Attorney.

United States Patent Office 2,916,177
Patented Dec. 8, 1959

2,916,177

CONDUIT BOX ADAPTER

John F. Nottelmann and Paul Lebenbaum, Jr., Erie, Pa., assignors to General Electric Company, a corporation of New York Application December 28, 1955, Serial No. 555,953

1 Claim. (Cl. 220—3.7)

The invention described herein relates to adapters and more particularly to a conduit box adapter used with a dynamoelectric machine and has for its object the provision of an inexpensive and simply constructed device capable of supporting any one of a number of different size conduit boxes on the machine and in providing ease in relocating the conduit box in the event of change in attitude or position of the machine.

Probably the most common practice of attaching a conduit box to a dynamoelectric machine consists in cutting a hole in the frame or housing of the machine and then welding an apertured plate over the hole so that the machine leads can be conducted through the hole and plate to the conduit box which is attached thereto. The principal disadvantage of this construction is that the machine is limited in use since the box is permanently attached to one side, and although flexibility of machine use is obtained by installing a second box on the other side of the machine, duplication of parts and labor is required. Further, the plate and boxes are usually designed in a manner wherein only one size conduit box is adapted for attachment to the plate. Still another practice is to cut, thread and install a section of pipe or conduit on the machine in the field prior to attaching a conduit box on the pipe by lock washers or similar securing means, but this practice likewise is deficient in providing flexibility to the machine.

In carrying out our invention, we eliminate the above-cited disadvantages resulting from the welded plate arrangement and from the necessity of custom fitting each conduit box to a pipe section, by providing an adapter capable of being readily and conveniently installed at any point about the periphery of a machine housing. The adapter is furnished with an integrally formed flange or plate designed to receive any one of a number of different size conduit boxes that can be selectively attached to the plate according to space requirements for the machine leads.

For a more complete understanding of the invention, reference is now made to the following description taken in conjunction with the drawings in which:

Figure 1 is a view in elevation, partly in section, showing the arrangement of an adapter for supporting conduit boxes of various sizes on the housing of a machine;

Figure 2 is a right side view of the device shown in Figure 1; and

Figure 3 is an end view of a machine showing the various locations in which the adapter can be selectively positioned.

Referring now to the drawings wherein like reference characters designate like or corresponding parts throughout the several views, there is shown a dynamoelectric machine 10 provided with internally recessed threads 12 for receiving a conduit box adapter 14. As shown in Figure 1, the adapter 14 is made from a hollow casting and comprises a shank 15 having external threads 16 arranged for coaction with threads 12, and terminates in an upstanding flange or plate 18 integrally formed on an end of the casting.

The shank 15 is made to a length just sufficient to terminate short of the inner peripheral surface when the casting is threaded into the frame of the machine. In order to prevent chafing or cutting of insulation provided on leads extending from the motor through adapter 14 to the conduit box, the entrant portions of the frame and adapter are rounded as indicated at 17 to provide a smooth surface free of sharp or jagged edges.

In the particular embodiment disclosed herein, plate 18 is arranged for positioning within approximately ¼ inch of the frame of the machine, although it is to be understood that this distance can be varied to suit different types and sizes of machines. A plurality of equidistantly spaced threaded openings 20 are formed in plate 18 and such openings correspond with similarly spaced apertures bored in a back wall 21 of triangular shaped bracket 22. As shown, the bracket 22 is provided with triangular shaped sides 23 and a flat bottom 25 which are cast, stamped or otherwise shaped with wall 21 to form a complete conduit box half. This half is detachably fixed to the plate 18 by screws or bolts 24, or similar securing means. The other half of the box consists of a similarly shaped triangular cover 26 equipped with a pair of channels 27 extending normal to the edges of sides 23. This other half is secured to the half mounted on the plate by threaded bolts 28 which slide within the channels 27 and threaded into a female fitting 37 integrally formed with the back wall 21, thus permitting speedy assembly of the conduit box. Appropriate openings are provided in the bottom 25 to facilitate entry of wires to the machine as in a usual manner.

In some installations, it is desirable to provide a waterproof joint, and in such case, a rubber washer or gasket 30 is inserted between the plate 18 and bracket 22 prior to the tightening of screws 24 in the plate openings 20. As is evident, the gasket may be applied to the structure according to the dictates of machine use.

As shown in Figures 1 and 2, any one of a number of conduit boxes, the various sizes being shown by dotted lines in these figures, are adapted for mounting on the adapter by virtue of the spacing of holes in the brackets which match or align with the openings 20 in plate 18. A particular advantage derived from this construction is that one adapter made from a single casing is capable of receiving conduit boxes of various sizes, thereby eliminating the need for providing special parts for different size machines. Since the openings 20 in plate 18, and those in the boxes, are equidistantly spaced with respect to one another, any one box can be rotated to any of four positions by merely turning the box with respect to plate 18, and the box can be made to assume any angle in between by a slight turn of the adapter in the machine housing.

In installations where extra large size conduit boxes are desirable, but plate 18 is not sufficiently large to accept such boxes, it will be evident that an adapter having an oversize plate can be provided to accommodate boxes of greater dimensions and thereby increase the utility of the machine.

As shown in Figure 3, the conduit box adapter 14 can be mounted at any point around the frame of the machine 10 by merely drilling and tapping a hole of a size capable of receiving the adapter. This feature is of particular importance when the machine is relocated to a different site since the adapter can be easily removed and attached at any other point on the frame which will conveniently accept the leads extending from the machine.

Obviously many modifications and variations of the present invention are possible in light of the above teachings. It is therefore to be understood that within the scope of the appended claim the invention may be practiced otherwise than as specifically described.

What we claim as new and desire to secure by Letters Patent of the United States is:

An adapter for use with dynamoelectric machines comprising a casting having a hollow screw-threaded shank adapted for engagement with a housing for the machine, a plate integrally formed with said shank to form a T, a plurality of openings symmetrically disposed in the plate and about the shank axis, a bracket comprising a conduit box first half equipped with a wall having apertures mating with the threaded openings in said plate for permitting mounting of the box in any one of a plurality of positions thereon, oppositely disposed triangular side walls and a bottom wall joined with said back wall, means extending through said apertures and openings for detachably securing the bracket to said plate, a cover comprising a conduit box second half shaped to the same configuration of the first half and complementarily disposed on said first half, said second half being equipped with a pair of channel members extending normal to the edges of the triangular side walls, second channel members affixed to said back wall and in alignment with the channel members in said cover for receiving bolts utilized in securing together the first and second halves comprising said box.

References Cited in the file of this patent

UNITED STATES PATENTS

| | | |
|---|---|---|
| 728,696 | Frankenberg et al. | May 19, 1903 |
| 1,462,209 | Miner | July 17, 1923 |
| 1,607,436 | Chandeysson | Nov. 16, 1926 |
| 1,799,071 | Smith | Mar. 31, 1931 |
| 2,218,371 | Zachar | Oct. 15, 1940 |
| 2,592,070 | Robinson | Apr. 8, 1952 |
| 2,674,371 | Blackinton | Apr. 6, 1954 |
| 2,777,998 | Shepherd | Jan. 15, 1957 |